Patented Aug. 1, 1950

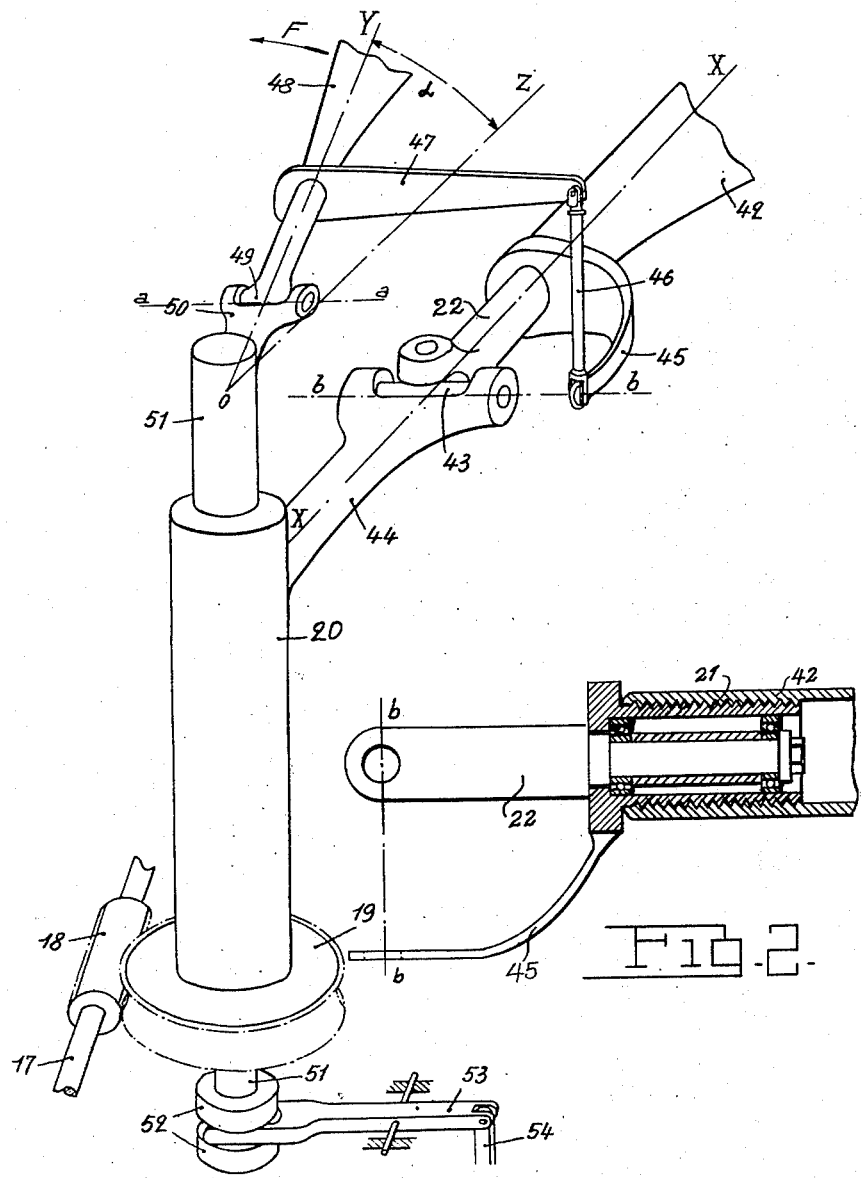

2,517,282

UNITED STATES PATENT OFFICE 2,517,282

AIRCRAFT WITH SUSTAINING AIRSCREW

André Aimé Lucien Bruel, Paris, France

Original application May 10, 1945, Serial No. 593,044. Divided and this application July 17, 1946, Serial No. 684,231. In France December 5, 1942

Section 1, Public Law 690, August 8, 1946
Patent expires December 5, 1962

2 Claims. (Cl. 170—160.13)

1

The present application is a division of applicant's copending patent application 593,044, filed May 10, 1945.

The invention relates to aircraft with sustaining airscrews or rotors such as helicopters and Autogiros of the type wherein an auxiliary or pilot airscrew is coaxially associated with the sustaining airscrew in such manner that flapping of the hinged blades of the pilot airscrew in a radial plane causes an alteration of the pitch of a corresponding wing of the sustaining airscrew for automatically altering the pitch of the sustaining airscrew so as to avoid or reduce cyclic flapping of the wings of said airscrew.

The invention has for its object to devise a simple means for bodily altering the pitch of the various wings of the sustaining airscrew, by a predetermined amount, under the manual control of the pilot, without interfering with the automatic and cyclic variations of the pitch of said wings, caused by the cyclic flapping of the blades of the pilot airscrew.

Further objects and features of the invention will be set forth in the following description, with reference to the accompanying drawing in which Fig. 1 is a perspective view of the pitch control device according to the invention.

Fig. 2 is a horizontal axial section of a sustaining blade.

Referring to the drawing, 20 denotes the vertical hollow shaft of a sustaining airscrew, from which radiate a number of arms 44, each connected by a universal coupling or Cardan joint 43 with a wing trunnion 22. Upon each trunnion 22 is rotatably mounted a rotor wing 42, which is thus rotatable about the longitudinal axis XX. Each blade is integrally connected with a lever 45, arranged rearwardly with respect to the direction of the rotation (arrow F), said lever being connected to a link 46 pivotally attached at the end of a lever 47, integral with the blade 48 of the pilot airscrew. Said blades 48 are hinged at 49, about horizontal axes $a$—$a$, to arms 50, integral with a shaft 51 extending through shaft 20. Each blade 48 is not superposed to the corresponding blade 42, but its axis OY makes an angle $a$ with the line OZ situated in the same vertical plane as axis X—X, blade 48 being preferably in advance with respect to blade 42, for the direction of rotation F, by the angle $a$ (in practice $a$ equals about 90°).

It will be understood that any vertical flapping motion of each pilot blade 48 about axis $a$—$a$ will

2 be transmitted through lever 47, link 46 and lever 45 to rotor blade 42, thus causing a variation of the pitch of the latter.

It will be noted that the pivotal joint of lever 45 and link 46 is located approximately on the horizontal pivot axis $bb$ of the hinged blade, in order that flapping motion of the latter should not materially change the pitch thereof.

To shaft 20 may be keyed a worm gear 19, meshing with a worm 18, keyed to a control shaft 17 operatively connected with the engine crankshaft for driving the sustaining blades.

The purpose of the arrangement above described is the following: without any pilot airscrew, the hinged blades of the rotor are in equilibrium under the contrary effect of centrifugal force, the aerodynamic reaction and the forces of inertia. In rotation, the leading blade (the one which advances against the relative wind at the instant under consideration) is subjected to the action of the relative wind, increased by the own tangential speed of the blade; at the same instant, the opposite blade (assuming there are 4 blades set at 90°), that is the blade which moves to the rear, in the same direction as the relative wind, is subjected to the action of the relative wind, decreased by the own tangential speed of the blade; the two other blades are essentially subjected to the action of the air due to the own tangential speed of these blades. Thus the first mentioned blade tends to rise above the trajectory it would have if there were no relative wind and the second mentioned blade tends to move below said trajectory. As the rotation proceeds, each blade successively passes through the four positions above-mentioned, thus flapping up and down in a periodic manner. Moreover, the inertia of the blades causes a lag of the flapping motion which is out of phase with the rotary motion and the result is the same as if the rotor would rotate about an inclined axis.

This obliquity of the trajectory relatively to the driving shaft of the rotor, together with the flapping motion of the blades, brings about vibrations and a reaction upon the controls, which interfere with their proper actuation by the pilot.

The arrangement according to the invention provides for the elimination of this flapping motion and eccentric rotation for the following reason: the pilot blades, which are responsive to the cyclic variations of the aerodynamic forces cause a cyclic variation of the pitch of the rotor blades, which compensates for the effect of said cyclic variations of the aerodynamic forces on the rotor blades. Thus, when a pilot blade 48 rises, due to an increase of the aerodynamic forces, it reduces the pitch of the rotor blade so as to exactly compensate the effect of said forces thereon and vice-versa, and the lag due to the inertia is compensated by the angle of advance of the pilot blades relatively to the rotor blades. Flapping motion of the latter is thus eliminated, and the axis of rotation of the rotor thus coincides with the axis of shaft 29.

When hovering, an increase of the speed of rotation of shaft 29 increases the lift and hence the vertical induced velocity; the pilot blades are lowered bodily, thus increasing the pitch of the rotor blades, and preventing overracing of the engine, and vice-versa.

In vertical falling, the pilot blades are raised, thus bodily reducing the pitch of the rotor blades, until the pitch thereof reaches the value corresponding to autorotation of the rotor.

In addition to these automatic and cyclic variations of the pitch of the sustaining wings, and without interfering therewith, the invention provides simple means for bodily altering the pitch of all sustaining wings, under the pilot's manual control. This is achieved by imparting a translation to shaft 51 with respect to shaft 29, which causes a vertical movement of the pilot airscrew, with respect to the sustaining airscrew thus altering to the same extent the pitch of all rotor wings, and providing a means for varying the pitch of the rotor under the control of the pilot. For this purpose, shaft 51 may be provided with a grooved sleeve 52, keyed to said shaft and engaged by a pivoted fork 53, connected with any suitable control lever within the pilot's reach by a transmission means such as 54.

Obviously the invention is not limited to the embodiments above described, which have been given solely by way of example.

Having now described my invention what I claim as new and desire to secure by Letters Patent is:

1. A sustaining rotatable wing for helicopters comprising in combination a sustaining airscrew, a hollow shaft for said airscrew, said airscrew embodying a number of radiating arms secured to said hollow shaft, an equal number of wing trunnions, universal couplings connecting said arms with said trunnions, respectively, an equal number of wings rotatably mounted on said trunnions, respectively, a pilot airscrew, a control shaft for said pilot airscrew, extending through and adapted to be guided by and to slide within said hollow shaft, said pilot air screw comprising a number of blades equal to said wings, said blades being pivoted to said control shaft about axes at right angles with said control shaft, mechanical connecting means for operatively connecting each of said blades with a corresponding wing, whereby flapping of a blade in a radial plane causes rotation of the corresponding wing about its trunnion, means for rotating said hollow shaft and said control shaft, and manually operable means for axially displacing said control shaft relatively to said hollow shaft.

2. A sustaining rotatable wing as claimed in claim 1, wherein said connecting means comprises a rearwardly directed lever secured to each of said blades, a rearwardly directed lever secured to each of said wings, and a link for connecting together the free ends of said levers.

ANDRÉ AIMÉ LUCIEN BRUEL.

REFERENCES CITED

The following references are of record in the file of this patent:

UNITED STATES PATENTS

| Number | Name | Date |
|---|---|---|
| 1,800,470 | Oehmichen | Apr. 14, 1931 |
| 1,828,783 | Oehmichen | Oct. 27, 1931 |
| 1,929,435 | McCullough | Oct. 10, 1933 |
| 2,041,789 | Stalker | May 26, 1936 |
| 2,041,796 | Stalker | May 26, 1936 |
| 2,121,345 | Hafner | June 21, 1938 |
| 2,396,590 | McDougal | Mar. 12, 1946 |